United States Patent
Geltner et al.

(10) Patent No.: US 8,316,152 B2
(45) Date of Patent: Nov. 20, 2012

(54) METHODS AND APPARATUS FOR MACHINE-TO-MACHINE COMMUNICATIONS

(75) Inventors: David Geltner, Naperville, IL (US); Steve Pazol, Highland Park, IL (US)

(73) Assignee: QUALCOMM Incorporated, San Diego, CA (US)

( * ) Notice: Subject to any disclaimer, the term of this patent is extended or adjusted under 35 U.S.C. 154(b) by 1073 days.

(21) Appl. No.: 11/353,785

(22) Filed: Feb. 13, 2006

(65) Prior Publication Data

US 2008/0313255 A1    Dec. 18, 2008

Related U.S. Application Data

(60) Provisional application No. 60/652,916, filed on Feb. 15, 2005.

(51) Int. Cl.
*H04L 12/56* (2006.01)
*G06F 15/16* (2006.01)

(52) U.S. Cl. ..... 709/245; 709/226; 709/237; 455/452.1; 455/466

(58) Field of Classification Search .......... 709/201, 709/227–230, 245, 226
See application file for complete search history.

(56) References Cited

U.S. PATENT DOCUMENTS

| | | | |
|---|---|---|---|
| 5,502,726 A * | 3/1996 | Fischer | 370/392 |
| 5,862,331 A | 1/1999 | Herriot | |
| 5,974,453 A | 10/1999 | Andersen et al. | |
| 6,442,159 B2 * | 8/2002 | Josse et al. | 370/354 |
| 6,490,291 B1 | 12/2002 | Lee et al. | |
| 6,549,776 B1 * | 4/2003 | Joong | 455/433 |
| 6,614,809 B1 | 9/2003 | Verma et al. | |
| 6,684,243 B1 | 1/2004 | Euget et al. | |
| 6,778,528 B1 | 8/2004 | Blair et al. | |
| 6,795,709 B2 | 9/2004 | Agrawal et al. | |
| 6,801,941 B1 | 10/2004 | Stephens et al. | |
| 6,810,420 B1 | 10/2004 | Buse et al. | |
| 6,822,955 B1 | 11/2004 | Brothers et al. | |
| 6,823,386 B1 | 11/2004 | Crump et al. | |
| 6,823,454 B1 | 11/2004 | Hind et al. | |
| 6,839,338 B1 | 1/2005 | Amara et al. | |
| 6,845,091 B2 | 1/2005 | Ogier et al. | |
| 6,845,094 B1 | 1/2005 | Zhang | |

(Continued)

FOREIGN PATENT DOCUMENTS

WO    WO03049384 A1    6/2003
WO    WO2004114579 A2   12/2004

OTHER PUBLICATIONS

International Search Report dated Jun. 17, 2007, PCT/US06/05308, International Search Authority—US.

(Continued)

*Primary Examiner* — Ian N Moore
*Assistant Examiner* — Thai Nguyen
(74) *Attorney, Agent, or Firm* — Gerald P. Joyce, III

(57) ABSTRACT

Methods and apparatus for machine-to-machine communications are disclosed. A communications server provides a way for application servers on the Internet to communicate with a plurality of physically remote devices that do not have "traditional" Internet connections. Communications between an application server and its remote devices are normalized by the communications server so that the need for a variety of wired and wireless protocols remains transparent to the application server. In addition, the application server may initiate communications with remote devices using dynamic IP addresses, because the communications server discovers dynamic IP addresses using a non-IP based protocol.

20 Claims, 11 Drawing Sheets

U.S. PATENT DOCUMENTS

| | | | |
|---|---|---|---|
| 6,862,286 B1 | | 3/2005 | Tams et al. |
| 7,043,264 B2 * | | 5/2006 | Vance et al. .................. 455/466 |
| 7,280,847 B2 | | 10/2007 | Goldthwaite et al. |
| 7,283,519 B2 | | 10/2007 | Girard |
| 7,613,811 B1 * | | 11/2009 | Bhalla et al. .................. 709/227 |
| 2002/0176404 A1 | | 11/2002 | Girard |
| 2003/0041151 A1 | | 2/2003 | Senapati et al. |
| 2003/0103506 A1 | | 6/2003 | Keller |
| 2003/0145073 A1 | | 7/2003 | Lee |
| 2003/0217174 A1 * | | 11/2003 | Dorenbosch et al. ......... 709/237 |
| 2004/0006712 A1 | | 1/2004 | Yao et al. |
| 2004/0017816 A1 | | 1/2004 | Ishwar et al. |
| 2004/0052214 A1 * | | 3/2004 | Teh et al. ...................... 370/238 |
| 2004/0153550 A1 | | 8/2004 | Payeur |
| 2004/0176134 A1 * | | 9/2004 | Goldthwaite et al. ........ 455/558 |
| 2004/0240393 A1 | | 12/2004 | Nishida et al. |
| 2004/0260722 A1 | | 12/2004 | Allen et al. |
| 2005/0148329 A1 * | | 7/2005 | Brunet et al. .............. 455/432.2 |

OTHER PUBLICATIONS

Written Opinion dated Jun. 17, 2007, PCT/US06/05308, International Search Authority—US.

International Preliminary Report on Patentability dated Oct. 16, 2007, PCT/US06/05308, IPEA—US.

Chakravorty, R. et al., "Flow Aggregation for Enhanced TCP Over Wide-Area Wireless," INFOCOM 2003; Twenty-Second Annual Joint Conference of the IEEE Computer and Communications Societies. IEEE Societies, vol. 3, pp. 1754-1764, Mar. 30-Apr. 3, 2003, Retrieved from the Internet: <URL: http://ieeexplore.ieee.org/stamp/stamp.jsp?tp=&arnumber=1209198&isnumber=27207>.

Graudins, J. et al., "Application Server Evaluation Method," In Proceedings of the International Conference on Computer Systems and Technologies and Workshop for PhD Students in Computing, Jun. 16-17, 2005, p. IIIB6/1-6, Varna, Bulgaria [retrieved on Jun. 18, 2007]. Retrieved from the Internet: <URL: http://ecet.ecs.ru.acad.bg/cst05/Docs/cp/SIII/IIIB.6.pdf>.

Adam Dunkels et al., "Connecting Wireless Sensornets with TCP/IP Networks", Jan. 21, 2004, Wired/Wireless Internet Communications; [Lecture Notes in Computer Science; ; LNCS], Springer-Verlag, Berlin/Heidelberg, pp. 143-152, XP019002433, ISBN: 978-3-540-20954-6.

Anonymous: "nPhase Provides Nation's First Global M2M Wireless Connectivity Solution with Sprint PCs and Cingular", Dec. 16, 2004, pp. 1-4, XP002639391, Retrieved from the Internet: URL:http://www.automatedbuildings.com/releases/dec04/newsbrief.htm [retrieved on May 24, 2011] cited for establishment of publication date of XP002639390;.

Anonymous: "Solving the "Messy Network" Problem: nPhaseDSN for Machine-to-Machine Communications", Dec. 16, 2004, pp. 1-9, XP002639390, Retrieved from the Internet: URL: http://www.nphase.com/pdfs/white_papers/messy_networks.pdf [retrieved on May 24, 2011] Sections "Two-way communication", "Mulitiple Communication Paths", "nPhaseDSN".

Srisuresh, P. et al., "Traditional IP Network Address Translator (Traditional NAT); rfc3022.txt", IETF Standard, Internet Engineering Task Force, IETF, CH, Jan. 1, 2001, XP015008805, ISSN: 0000-0003.

Supplementary European Search Report—EP06735119—Search Authority—Munich—May 31, 2011.

* cited by examiner

METHODS AND APPARATUS FOR MACHINE-TO-MACHINE COMMUNICATIONS

RELATED APPLICATIONS

This U.S. Utility Patent Application claims the benefit of U.S. Provisional Patent Application Ser. No. 60/652,916 filed on Feb. 15, 2005.

TECHNICAL FIELD

The present disclosure relates in general to network communications and, in particular, to methods and apparatus for machine-to-machine communications.

BACKGROUND

Many machine monitoring and control systems include electrical communication between two machines. For example, a credit card reading machine at a grocery store communicates with a bank computer to verify a credit transaction. Often, engineers designing these machine-to-machine communication systems use data networks such as the Internet to facilitate communication between two machines or devices. For example, the Federal Aviation Administration (FAA) has a rule that transmission towers above a certain height must include a warning light for low flying aircraft. When the light burns out, the owner or operator of the tower must notify the FAA and must fix the light within a certain period of time. A notification system including a software application residing on a typical Internet server may be charged with notifying the FAA (and maintenance personnel) when a light on top of a tower goes out. However, there may be no readily convenient and cost effective way to hard-wire each of the light sensors on the hundreds or thousands of monitored towers. Instead, engineers use wireless communication to facilitate machine-to-machine communication between each of the towers and the notification system.

Wireless connections to the Internet have at least the following two problems. First, all of the physical areas that contain the remote devices may not be covered by the same wireless system. Some areas may be covered by Code Division Multiple Access (CDMA) cellular systems, but not by General Packet Radio Service (GPRS) or SMS. Other areas may be covered by GPRS, but not by CDMA. Some areas may have no wireless coverage at all. When no wireless service is available, the remote device may need to use the Plain Old Telephone System (POTS).

Simultaneously interfacing with multiple different protocols such as CDMA, GPRS, SMS, MMS, WiFi, WiMax, POTS, cable, DSL, satellite, etc is burdensome. An engineer designing the monitoring and control software must keep track of which devices use which protocols and adapt the software application accordingly. If one of the protocols (of which there are many) used by one of the devices (of which there may be thousands) changes, the engineer must adapt the software to accommodate this change. Therefore, a need exists for a system that enables engineers to design systems that can communicate with a wide variety of remote devices without or with little concern for what protocol(s) are required to communicate with each device.

The second problem is that wireless Internet devices are often assigned a "dynamic" Internet Protocol (IP) address. A dynamic IP address is a network address that changes. Originally, devices connected to the Internet each had a unique IP address that did not typically change (i.e., a static IP address). However, as the number of devices connected to the Internet have increased, the number of available IP addresses have started to become exhausted.

To conserve this limited number of IP addresses, wireless access providers assign IP addresses to a remote device dynamically on an as needed basis. More specifically, the wireless access providers keep a pool of IP addresses (e.g., 1,000) that is shared by a larger number of devices (e.g., 10,000). When a device is communicating, the wireless access provider assigns that device one of the available IP address. When a device is not communicating, that device does not have an assigned IP address. In this example, as long as no more than 1,000 of the possible 10,000 devices are communicating or are online simultaneously, the system works.

However, as a result of the dynamic allocation of IP addresses, a particular device may have one IP address at one time and another IP address at another time (or no IP address at all most of the time). This works fine for communications that are initiated by the remote device. However, when a machine such as the notification system needs to initiate a message to the remote device, the initiating device does not know what IP address to use for the remote device, because that address may have changed numerous times and/or the device may not even be currently assigned an IP address. Therefore, a need exists for a system that enables software running on application servers to initiate communication with remote devices without concern for the dynamic IP address associated with each remote device.

SUMMARY

The system described herein solves both of these problems using a communications server. The first problem is solved because the communications server normalizes data communications from different communications systems or protocols. More specifically, the communications server translates all of the communications between an application server and its associated remote stations, so that the application server need not determine what protocols are being used to communicate with the remote stations. Some remote stations may use one wireless protocol (e.g., CDMA), other remote stations may use another wireless protocol (e.g., GPRS), and still other remote stations may not use any wireless protocol (e.g., POTS). Regardless of what protocol a particular remote device is using, the communications server translates messages from the application server to the native language of the remote device. Similarly, the communications server translates messages from the remote device to the native language of the application server.

The second problem is solved because the communications server knows or discovers a remote station's dynamic IP address. Messages addressed to a particular remote device (e.g., using an internal static IP address) are first routed to the communications server. The communications server may already know the remote station's dynamic IP address via information sent from a wireless network associated with the remote station, and/or the remote station may send a data packet to the communications server each time the remote station receives a new IP address. Alternatively, the communications server may discover the remote station's dynamic IP address by sending the remote station a non-IP based message. For example, the communications server may send a remote station a Short Message Service (SMS) message to "wake-up" the remote station. SMS messages are based on a phone number, not an IP address. The communication server determines the remote station's non-IP address (e.g., phone number) by looking up the non-IP address based on the received station identifier (e.g., internal static IP address).

After the remote station receives the non-IP based message, the remote station acknowledges the communications server. In some instances, the remote station continues to communicate with the communications server via the non-IP based protocol (e.g., SMS). In other instances, the remote station establishes IP based communication with the communications server. This has the effect of obtaining an IP address from the wireless provider which is inherent in subsequent messages sent to the communications server. Regardless of what protocol a particular remote station "prefers" to use, the communications server keeps track of that protocol and adapts its communications with that device accordingly.

Therefore, the present system and method has the advantage of giving software designers transparent communication to a plurality of remote devices. The application designer need not be concerned with what protocol each remote device is using and what IP address (if any) is associated with each remote device. Instead, the application server simply identifies the remote device (e.g., by a permanent device number), and the communications server resolves all of the protocol and IP address issues.

DETAILED DESCRIPTION OF EXEMPLARY EMBODIMENTS

Figure 1:
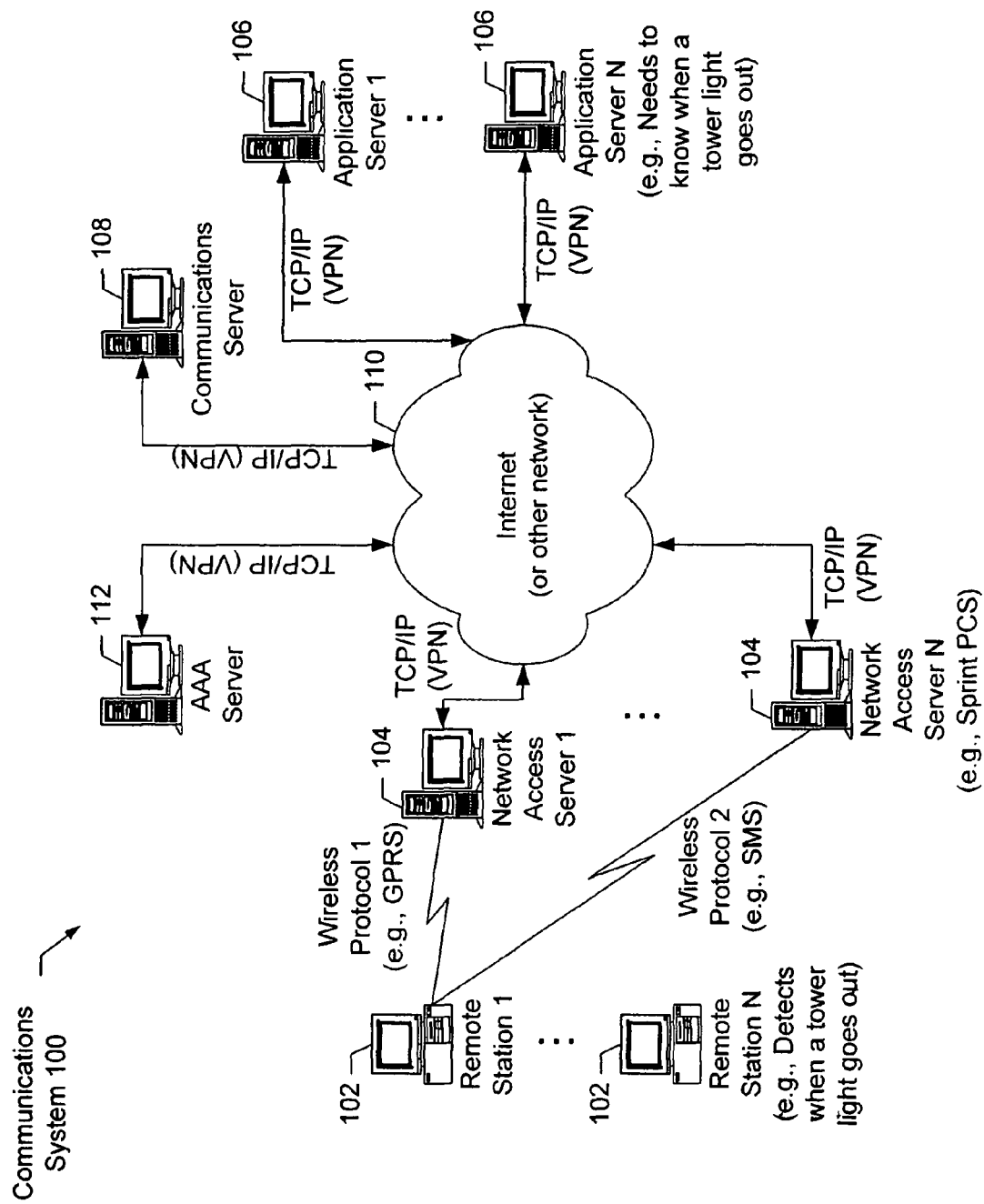
FIG. 1 is a high level block diagram of an example communications system.

A high level block diagram of an exemplary network communications system 100 is illustrated in FIG. 1. The illustrated system 100 includes one or more remote stations 102, one or more network access servers 104 (e.g., a wireless telephone company server such as Sprint PCS), one or more application servers 106, one or more communications servers 108, and one or more authentication, authorization, and accounting (AAA) servers 112. Each of these devices may communicate with each other via a connection to one or more communications channels 110 such as the Internet or some other suitable network.

Each server 104, 106, 108 and 112 stores a plurality of files, programs, and/or web pages for use by the remote stations 102. In particular, each application server 106 hosts one or more programs designed to monitor and/or control a plurality of remote stations 102. For example, each remote station 102 may be associated with a tower that includes a light to make the tower visible to low flying aircraft. When the light burns out, the remote station 102 needs to report that information to the application server 106 so that the application server 106 can report the outage to the FAA and maintenance personnel. The AAA server 112 handles requests for access to computer resources and provides authentication, authorization, and accounting (AAA) services.

One server 104, 106, 108 and/or 112 may interact with a large number of remote stations 102. Accordingly, each server 104, 106, 108 and 112 is typically a high end computer with a large storage capacity, one or more fast microprocessors, and one or more high speed network connections. Conversely, relative to a typical server 104, 106, 108 and 112, each remote station 102 typically includes less storage capacity and a single microprocessor. However, as described in detail below, each remote station 102 preferably supports multiple network connections and/or protocols.

Figure 2:
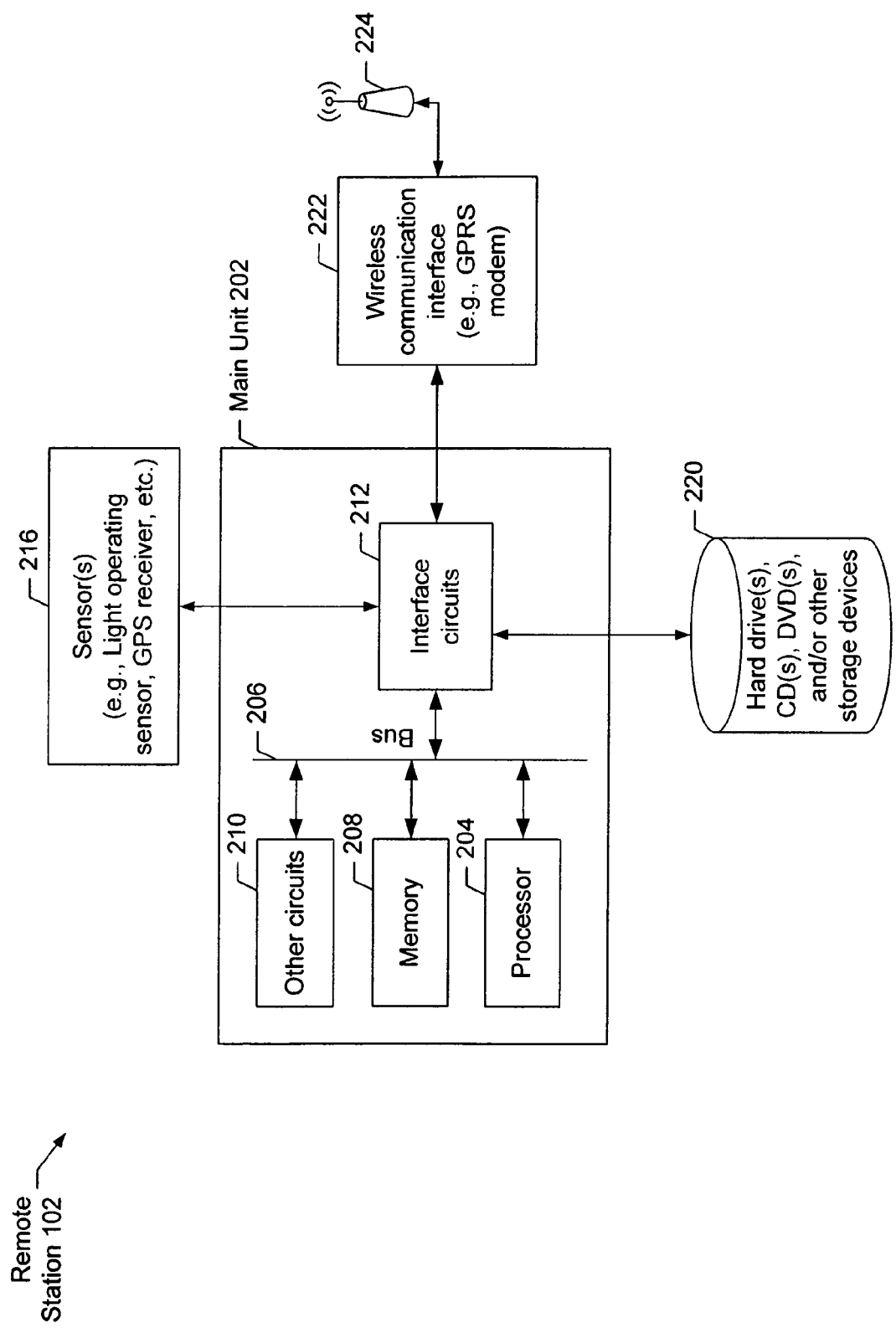
FIG. 2 is a more detailed block diagram showing one example of a remote station.

A more detailed block diagram of a remote station 102 is illustrated in FIG. 2. It will be appreciated that one or more components of a remote station 102 may be embedded into a product when the product is manufactured (e.g., an air compressor with an embedded wireless monitor), and/or one or more components of a remote station 102 may be added to a product after the product is manufactured (e.g., a cell tower light monitor).

The remote station 102 may include a controller or any other suitable device. The remote station 102 includes a main unit 202 which preferably includes one or more processors 204 electrically coupled by an address/data bus 206 to one or more memory devices 208, other computer circuitry 210, and one or more interface circuits 212. The processor 204 may be any type of suitable processor. The memory 208 preferably includes volatile memory and non-volatile memory. Preferably, the memory 208 stores a software program that interacts with the other devices in the system 100 as described below. This program may be executed by the processor 204 in a conventional manner. The memory 208 may also store digital data indicative of device settings, files, programs, web pages, protocols, etc. retrieved from a server 104, 106, and/or 108 and/or loaded over the air or into the firmware at the factory. The interface circuit 212 may be implemented using any suitable type of interface standard, such as a serial interface.

One or more sensors 216 are also connected to the interface circuit 212 for gathering data associated with the purpose of the remote station 102. For example, the sensor 216 may be a circuit to determine if a tower light is operating, a global positioning receiver, a temperature sensor, a water sensor, a smoke detector, a carbon-monoxide detector, and/or any other suitable sensor or combination of sensors.

One or more storage devices 220 may also be connected to the main unit 202 via the interface circuit 212. Typically, a flash ROM device is used. However, any suitable memory such as a hard drive, CD drive, DVD drive, and/or other storage devices or combination of storage devices may be connected to the main unit 202. The storage devices 220 may store any type of data used by the remote station 102.

The remote station 102 may also exchange data with other network devices via a wireless communication interface 222 and an antenna 224, which connects to a network access server 104. Preferably, the remote station 102 includes multiple modes of communication. For example, the remote station 102 may be capable of communicating using CDMA, GPRS, SMS, MMS, WiFi, WiMax, POTS, cable, DSL, satellite, etc.

Figure 3:
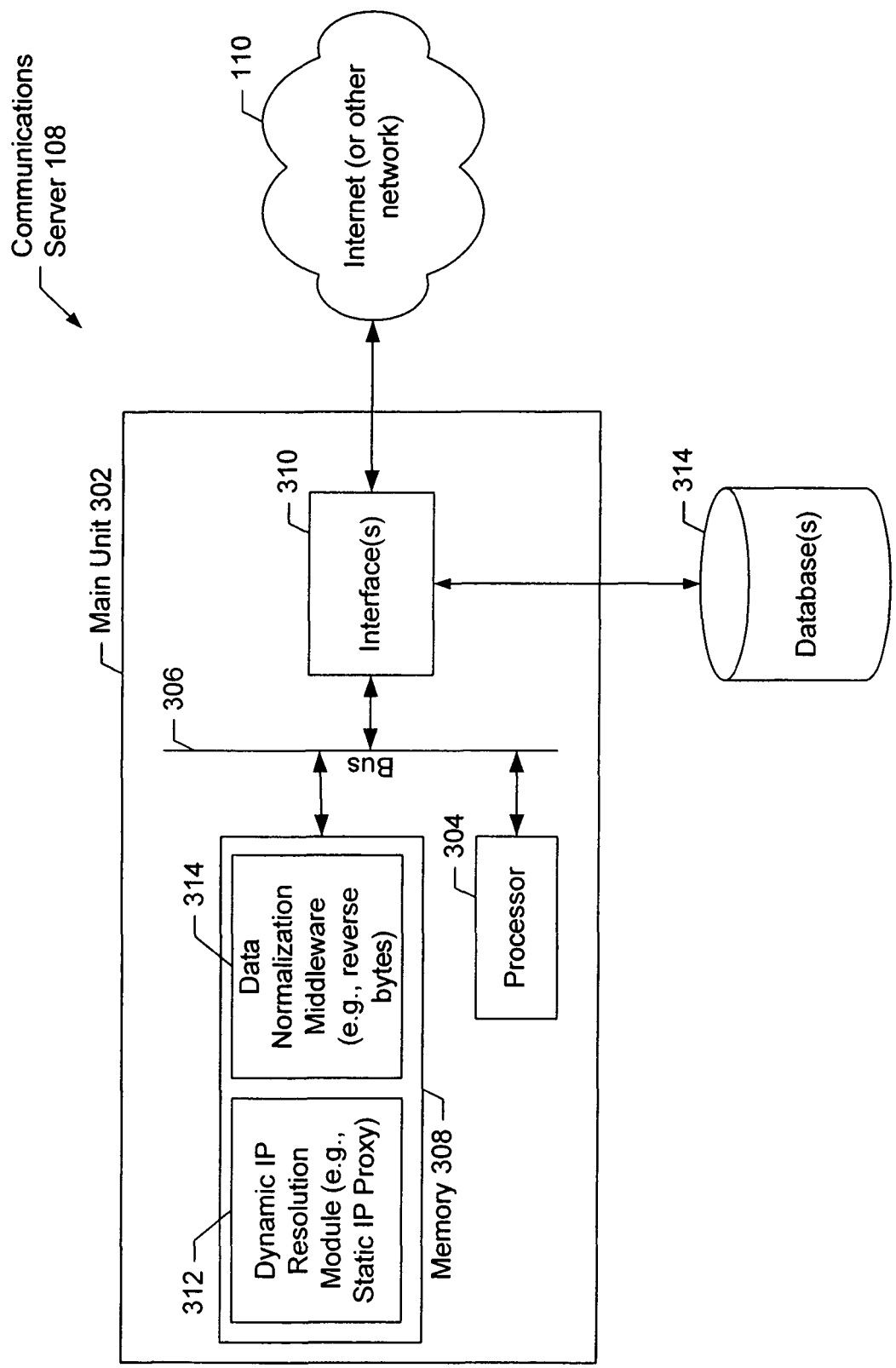
FIG. 3 is a more detailed block diagram showing one example of a communications server embodying the present system.

A more detailed block diagram of a communications server 108 is illustrated in FIG. 3. Like the remote station 102, the main unit 302 in the communications server 108 preferably includes a processor 304 electrically coupled by an address/data bus 306 to a memory device 308 and a network interface circuit 310. The network interface circuit 310 may be implemented using any suitable data transceiver, such as an Ethernet transceiver. The processor 304 may be any type of suitable processor, and the memory device 308 preferably includes volatile memory and non-volatile memory. Preferably, the memory device 308 stores a software program that implements all or part of the method described below.

In particular, the memory preferably stores a dynamic Internet Protocol (IP) resolution module 312 and a data normalization middleware module 314. The dynamic Internet Protocol (IP) resolution module 312 determines the dynamic IP address associated with the remote stations 102 as described in detail below. The data normalization middleware module 314 translates communications between the applications servers 106 and the remote stations 102 as described in detail below. These software modules may be executed by the processor 304 in a conventional manner. However, some of the steps described in the method below may be performed manually or without the use of the communications server 108. The memory device 308 and/or a separate database 314 also store files, programs, web pages, etc. for use by other servers 104, 106 and/or remote stations 102.

Figure 4:
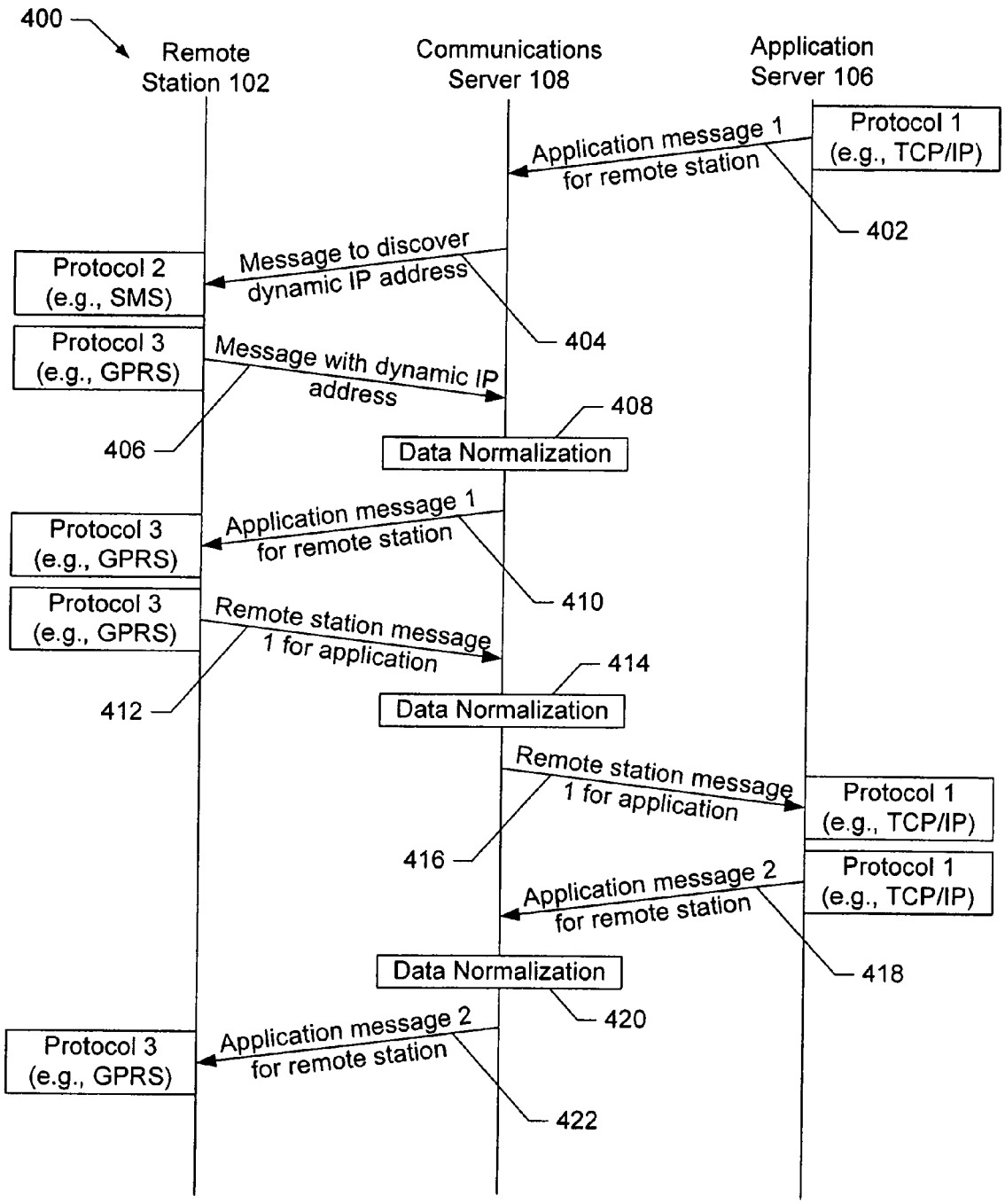
FIG. 4 is a message diagram showing an example communication exchange between an application server and a remote station via the communications server.

A message diagram showing communications 400 between an application server 106 and a remote station 102 via a communications server 108 is illustrated in FIG. 4. In this example, the application server 106 initiates the connection to the remote station 102 by sending a message 402 to the communications server 108. The message 402 includes an identifier associated with the remote station 102 and a data payload for the remote station 102. The remote station identifier may be any suitable identifier. For example, the remote station identifier may be a device ID number or a static IP address. By using a VPN and an internal static IP address, application servers 106 may operate as if remote devices 102 with dynamic IP address actually have static IP addresses. This enables legacy systems that expect static IP address to communicate with new remote devices 102 without any modification to the legacy systems.

Certain applications, such as those based on POTS, rely on static IP addresses. The system described herein provides a mechanism using private IP addresses, VPN client access to those addresses, and either a TCP or a UDP proxy server process to enable these applications to operate in a dynamic address environment (e.g., wireless) without extensive modifications. To establish communications to a remote device 102 the application server 106 communicates to either the TCP or the UDP proxy server via a private static IP address assigned to that particular remote device 102. The proxy server (either UDP or TCP), then determines the current dynamic IP address of the remote device 102 and establishes communications directly with the remote device 102. All messages that need to go to the remote device 102 from the application server 106 are sent through the appropriate proxy server.

In the example shown in FIG. 4, the communications server 108 is a separate device from the application server 106. Accordingly, a standard network protocol, such as transport control protocol/Internet protocol (TCP/IP) is used. However, in some embodiments, the communications server 108 is implemented in the same device as the application server 106. In such an instance, an internal communication scheme, not requiring the use of a network protocol, is preferably used to send messages from the application server 106 to the communications server 108. For example, the message may be passed as an argument to a procedure call and/or stored in a shared memory.

After the communications server 108 receives the message 402 from the application server 106, the communications server 108 determines if the message is larger than a predetermined threshold. If the message 402 from the application server 106 is smaller than the predetermined threshold, the communications server 108 may forward the message 402 to the remote station 102 using a non-IP based protocol. For example, messages smaller than 140 characters of data may be sent to the remote station 102 via an SMS message. Preferably, SMS messages may be sent in any suitable format because the communication server dynamically determines which application server the SMS message is associated with. If the message exceeds the threshold, the communications server 108 may need to forward the message to the remote station 102 using the IP address of the remote station 102. However, the remote station may be using a dynamic IP address, and/or the remote station may be temporarily offline.

A dynamic IP address is a network address that changes. To conserve a limited number of IP addresses, the network access server 104 assigns an IP address to a remote station 102 on an as needed basis. Because remote stations 102 are typically communicating only a relatively small percentage of the time, the remote stations 102 can share a pool of IP addresses associated with the network access server 104. When a remote station 102 needs to send a message, the remote station 102 requests an IP address from the network access server 104. The assigned IP address is then reserved for that remote station 102 for a short period of time (e.g., one hour). After that period of time, the IP address is returned to the pool of IP addresses, and the remote station 102 is left with no IP address.

Dynamic assignment of IP addresses creates a problem when another device needs to initiate a message to the remote station 102. The initiating device does not know where to send the message, because the remote station 102 may not have an IP address at the time the device wants to send the message to the remote stations 102. The communications server 108 may know the dynamic IP address associated with the remote station 102. For example, a network access server 104 associated with the remote station (e.g., a wireless telephone company server such as Sprint PCS) may keep the communications server 108 informed of the dynamic IP address associated with the remote station 102. Alternatively, the remote station 102 may send a data packet to the communications server 108 each time the remote station 102 receives a new IP address.

If the communications server 108 does not know the dynamic IP address associated with the remote station 102, the communications server 108 may discover the dynamic IP address by sending a different message 404 to the remote station 102. This message 404 may not be suited for large amounts of data (e.g., the message 402 that the application server 106 is trying to send to the remote station 102). However, this message 404 does not require the use of an IP address. For example, a Short Message Service (SMS) type message may be sent to the remote station 102 using a telephone number associated with the remote station 102.

More specifically, SMS is a service of Global System for Mobile (GSM) communications that is capable of sending up to 140 characters of data. SMS is primarily intended for text messages to cellular telephone users. If an application server 106 is attempting to send a short "action" message to a remote station 102 (e.g., "turn on the light"), then the communications server 108 may simply translate the message to an SMS message and send it to the remote station 102 without the need to switch to an IP based protocol as described in detail below. However, in this instance, the SMS message 404 is an "establish communication" message indicating that a larger communication exchange needs to occur. This type of SMS message tells the remote station 102 to request an IP address from the network access server 104. The assigned IP address is then sent from the remote station 102 to the communications server 108 in the form of an IP based message 406, such as a General Packet Radio Service (GPRS) message. Unlike SMS, GPRS is a high speed continuous connection that can be used to move large amounts of data.

Although the SMS protocol and the GPRS protocol are used throughout this description, any suitable protocols may used. For example, any of the following protocols may be used: CDMA, GPRS, SMS, MMS, WiFi, WiMax, POTS, cable, DSL, satellite, etc. In one embodiment, a remote station 102 may not have access to an IP based protocol. In such an instance, the remote station 102 uses a non-IP based protocol (e.g., SMS) to communicate back to the communications server 108, and the communications server 108 performs data normalization for the non-IP based messages before the messages are forwarded to the application server 106.

If the communication system 100 is functioning properly, the remote station 102 responds to the communications server 108 via a non-IP acknowledgment 406 to the non-IP message 404 and/or with a IP-based response 406 to the non-IP message 404. For example, the response 406 may be an SMS acknowledgement, an SMS message with the remote station's dynamic IP address, and/or a WiMax message with the remote station's dynamic IP address. If the communications server 108 fails to receive the response message 406 within some predetermined period of time, the communications server 108 preferably buffers the application message 402 for some predetermined period of time and/or until the communications server 108 is able to communicate with the remote station 102. For example, if the communications server 108 fails to receive the response message 406 within ten seconds, the communications server 108 may try to establish communication with the remote station 102 every ten seconds for the next thirty minutes.

After the communications server 108 receives the message 406 with the dynamic IP address associated with the remote station 102, the communications server 108 normalizes 408 the data sent by the application server 106 in the original message 402. For example, the communications server 108 may reverse the byte order of the message 402 (e.g., big Endean to little Endean), and/or the communications server 108 may convert the format of the message 402 to another format (e.g., to make the message 402 compatible with GPRS and/or the remote station 102). The data may be normalized by the communications server 108 at any time after receiving the data. For example, the communications server 108 need not wait until the dynamic IP address of the remote station 102 is known.

The communications server 108 then sends the normalized message 410 to the remote station 102 using the IP based protocol (e.g., TCP over GPRS). If the remote station 102 needs to reply to the message 410, the remote station 102 preferably sends the replay 412 using the same protocol. However, any suitable protocol may be used for the reply message. For example, if the reply message is short and the remote station 102 has SMS coverage, the reply message may be an SMS message.

Before the communications server 108 can forward the message to the application server 106, the communications server 108 normalizes the data 414. This time, the normalization process typically reverses the operations previously performed. For example, the communications server 108 may reverse the byte order of the message (e.g., little Endean to big Endean) and/or convert the format of the message 412 to make the message 412 compatible with the application server 106.

After the message 412 from the remote station 102 is normalized, the normalized message 416 is sent to the application server 106 using a protocol used by the application server (e.g., TCP/IP). If the communications server 108 is unable to communicate with the application server 106, the communications server 108 preferably buffers the normalized remote station message 416 for some predetermined period of time and/or until the communications server 108 is able to communicate with the application server 106. For example, if the communications server 108 may try to establish communication with the application server 106 periodically for some predetermined period of time.

If the application server 106 needs to send another message 418 to the remote station 102 while the remote station 102 still has the same IP address, the communications server 108 may simply normalize the data 420 and send the normalized message 422 to the remote station 102 without the need to send an SMS message to discover the dynamic IP address of the remote station 102. The communications server 108 may determine that the remote station 102 still has the same IP address by checking if the connection (e.g., a GPRS connection) to the remote station 102 is still open and/or by testing the last know IP address of the remote station 102 with a test message. If the connection is closed and/or the test message fails, the communications server 108 preferably sends another SMS message to rediscover the dynamic IP address associated with the remote station 102. It should be appreciated that protocols other than SMS may be used for this purpose.

In addition to the different uses of protocols described above, each remote station 102 is preferably capable of using "fallback" protocols, if one of the remote stations "primary" protocols fails. For example, some remote stations may be placed in areas where GPRS service is unavailable. As a back up, the remote station 102 may try one of the fallback protocols (e.g., SMS). In this manner, one remote station design may be deployed in a wide variety of geographical areas without reprogramming to accommodate different geographical areas that are covered by different protocols. In addition, this hierarchy of protocols enables remote stations 102 to use the most efficient protocol available to that remote station 102. For example, to an application server 106, three different remote devices 102 may appear to each have a static IP address. However, the first address may be associated with a CDMA based remote device 102, the second address may be associated with a GSM/GPRS based device, and the third address may be associated with a POTS based device.

Figure 5:
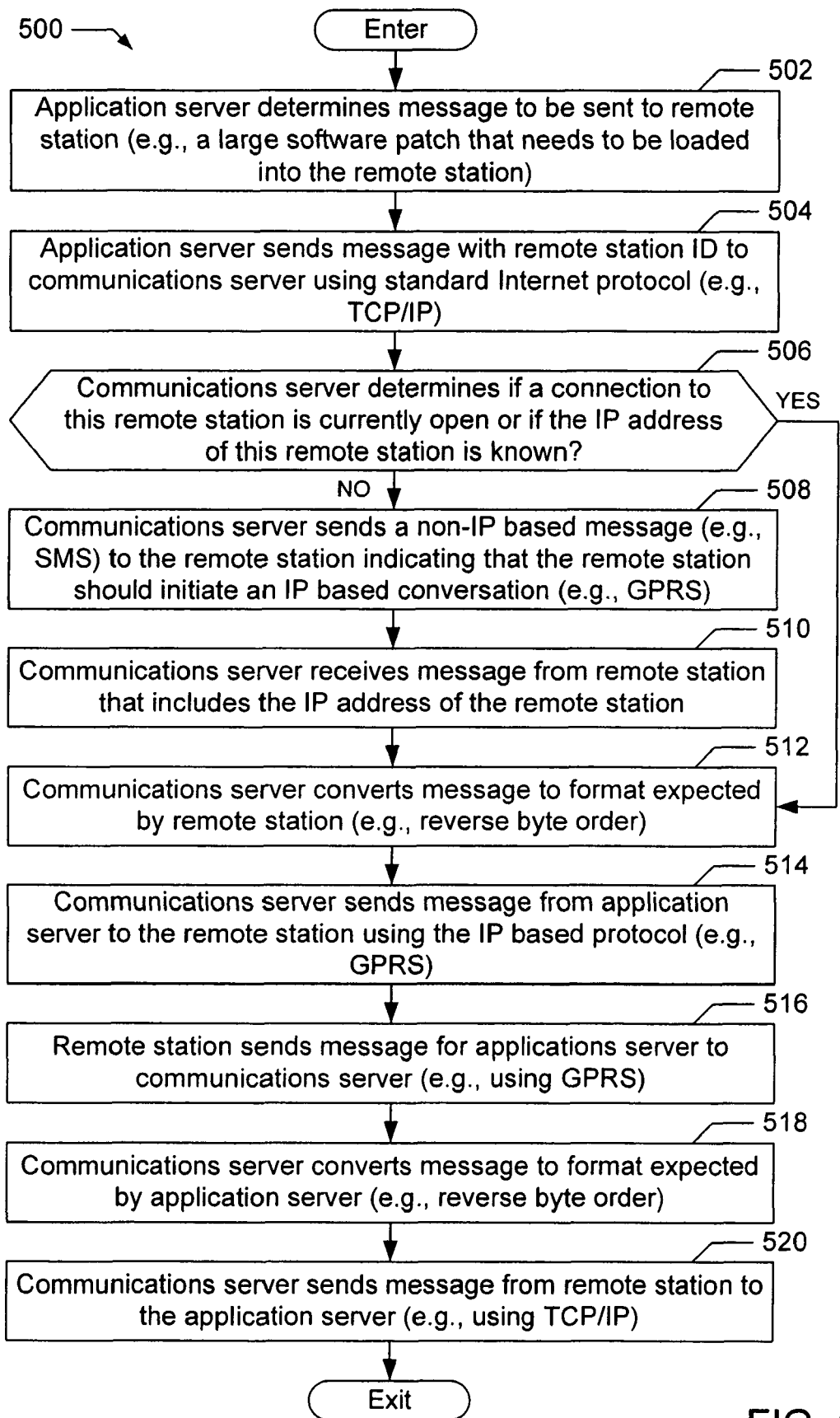
FIG. 5 is a flowchart of an example process for machine-to-machine communications according to the present system and method.

A flowchart of an example process 500 for machine-to-machine communications is illustrated in FIG. 5. Preferably, the process 500 is embodied in one or more software programs which is stored in one or more memories and executed by one or more processors. Although the process 500 is described with reference to the flowchart illustrated in FIG. 5, it should be appreciated that many other methods of performing the acts associated with process 500 may be used. For example, the order of many of the steps may be changed, and many of the steps described are optional.

Generally, the process 500 uses the communications server 108 to provide a way for an application server 106 to communicate with a plurality of remote stations 102. Communications between an application server 106 and its remote stations 102 are normalized by the communications server 108 so that the need for a variety of wired and wireless protocols remains transparent to the application server 106. In addition, the application server 106 may initiate communications with dynamically addressed remote stations 102 using static IP addresses (or other fixed identifiers), because the communications server 108 knows or discovers the dynamic IP addresses of the remote stations 102.

The process 500 begins when an application server 106 determines that it needs to send a message to a remote station 102 as indicated in block 502. For example, the application server 106 may have a large software patch that needs to be loaded into the remote station 102. The application server 106 then sends the message intended for the remote station 102 to the communications server 108 as indicated in block 504. This message is preferably sent to the communications server 108 over a standard Internet connection using a standard Internet protocol (e.g., TCP/IP). However, this message may also be encrypted using a Virtual Private Network (VPN) and/or any other suitable means of securing data.

The message from the application server 106 to the communications server 108 includes a remote station identifier other than an IP address. The remote station identifier may be a unique identifier assigned by the communications server 108, an internal static IP address, a Media Access Control (MAC) address, a telephone number, and/or any other suitable device identifier. In some instances, the remote station 102 will actually have a static (non-dynamic) IP address. In such an instance the remote station identifier may be the fixed IP address associated with the remote station 102, and no translation may be needed.

After the communications server 108 receives the message from the application server 106, the communications server 108 determines if a connection to the identified remote station is currently open or if the IP address of the identified remote station 102 is known as indicated in block 506. For example, the communications server 108 may send a test message to the last know IP address of the remote station 102.

If the IP address of the remote station 102 is not known, the communications server 108 sends a non-IP based message to the remote station 102 indicating that the remote station 102 should initiate an IP based conversation as indicated in block 508. For example, the communications server 108 may send an SMS message to the remote station 102. The capacity of the SMS message may be too small and/or the data rate too low to carry the full message from the application server 106. However, the SMS message does not require the communications server 108 to know the IP address of the remote station 102. Instead, the SMS message uses a phone number associated with the remote station 102. After the remote station 102 receives a dynamic IP address from a network access server 104, the communications server 108 receives the dynamic IP address from the remote station 102 as indicated in block 510.

The communications server 108 then converts the message from the application server 106 to a format expected by the remote station as indicated in block 512. For example, the communications server 108 may reverse the byte order of the message (e.g., big Endean to little Endean), and/or the communications server 108 may convert the format of the message to another format (e.g., to make the message compatible with GPRS and/or the remote station 102).

After the message from the application server 106 is normalized for the remote station 102, the communications server 108 sends the normalized message to the remote station 102 using the IP based protocol as indicated in block 514. For example, the communications server 108 may send the message to the remote station 102 using a GPRS based protocol. A non-IP based protocol may also be used.

Similarly, if the remote station 102 needs to reply to the application server 106, the remote station 102 preferably sends the reply to the communications server 108 using the IP based protocol as indicated in block 516. Again, before the communications server 108 can forward the message to the application server 106, the communications server 108 normalizes the data to make the message compatible with the application server 106 as indicated in block 518.

After the message from the remote station 102 is normalized, the normalized message 416 is sent to the application server 106 using a protocol used by the application server as indicated in block 520. For example, the communications server 108 may send the message from the remote station 102 to the application server 106 using TCP/IP over a VPN. By using a VPN, the data is secure between the servers 104, 106, and 108. Typically, wireless data (e.g., GPRS) is encrypted by the network access server 104.

If the application server 106 needs to send another message to the remote station 102 while the remote station 102 still has the same IP address, the communications server 108 may simply normalize the data and send the normalized message to the remote station 102 without the need to send an SMS message to discover the dynamic IP address of the remote station 102.

A series of block diagrams showing one example of a communication exchange between an application server and a remote station via the communications server is illustrated in FIGS. 6a-6f. In this example, in order to comply with an FAA rule, a tower light server 106 monitors a remote tower light client 102 to determine if a light on the tower is operational. In this example, the tower light server 106 would like to send a large software patch to the tower light client 102. However, the tower light server 106 does not know the IP address of the tower light client 102 (if any), and the software patch is too large to send to the tower light client 102 via SMS messaging.

Figure 6A:
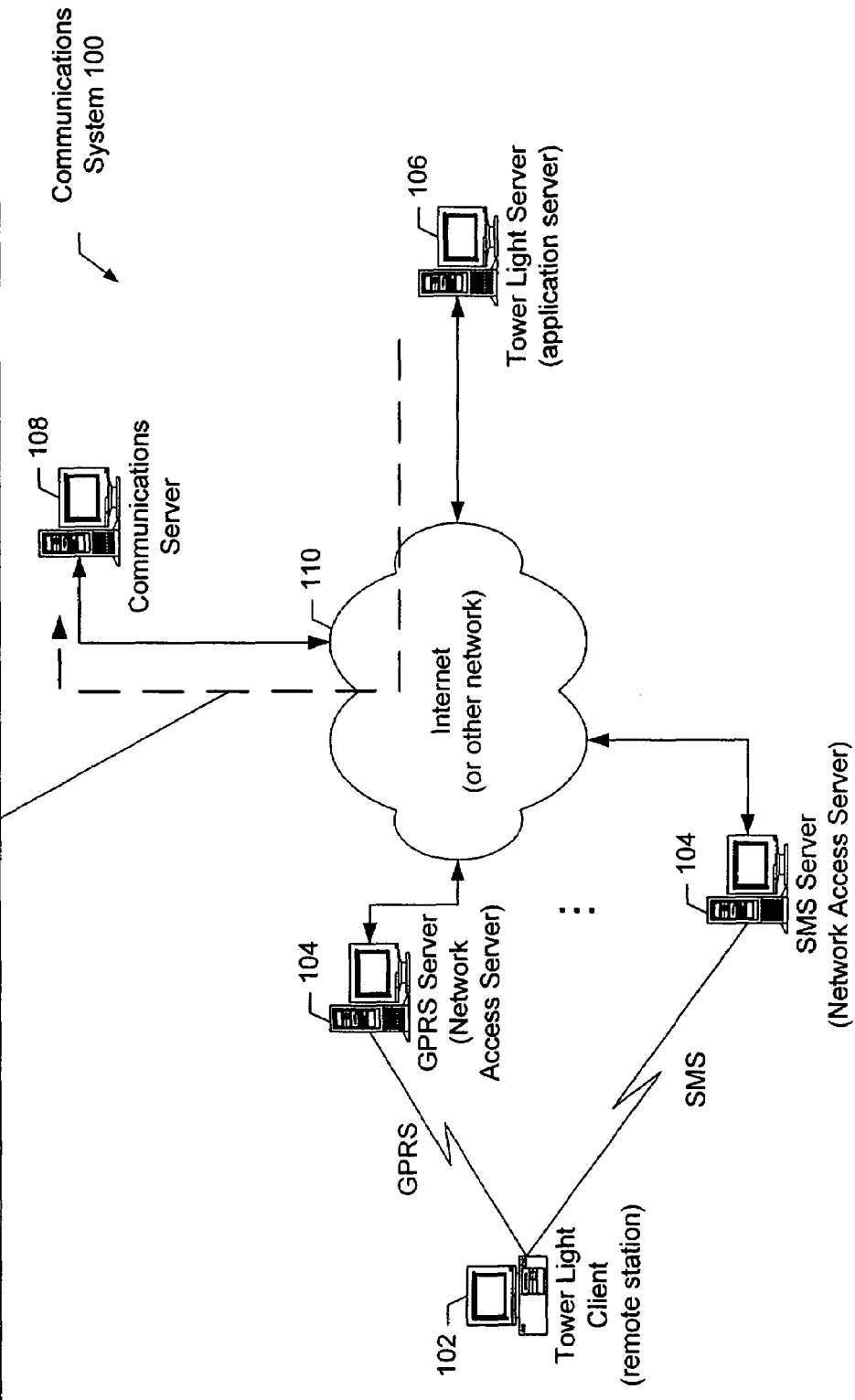
FIGS. 6a-6f are a series of block diagrams showing one example of a communication exchange between an application server and a remote station via the communications server.
Figure 6B:
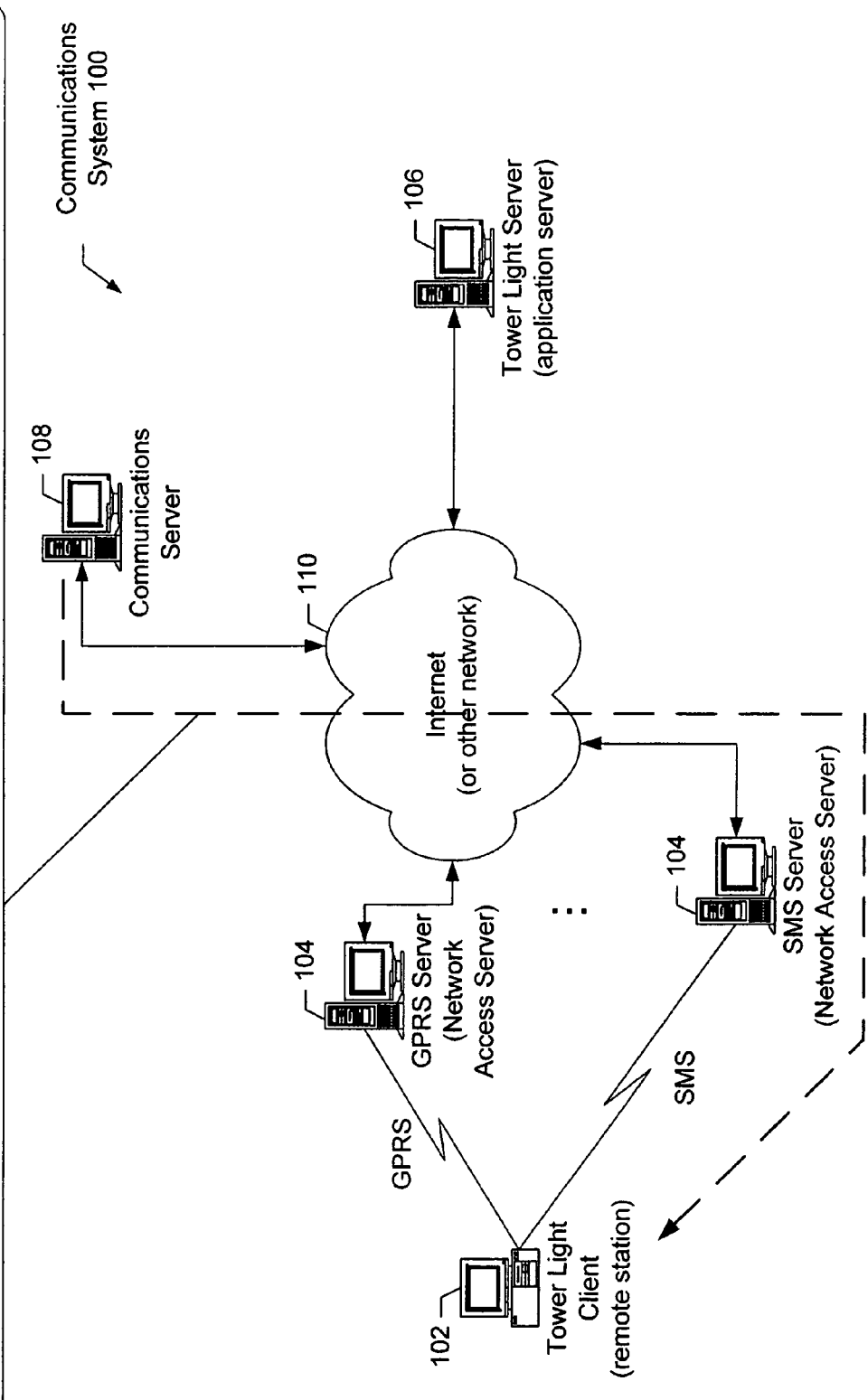

In FIG. 6a, the tower light server 106 sends the software patch to the communications server 108 with an identifier associated with the tower light client 102. In FIG. 6b, the communications server 108 determines that this software patch is too large to send to the tower light client 102 via SMS messaging and that it does not know a valid IP address for the tower light client 102. As a result, the communications server 108 sends a short message to the tower light client 102 via SMS requesting the tower light client 102 to communicate with the communications server 108 via GPRS.

Figure 6C:
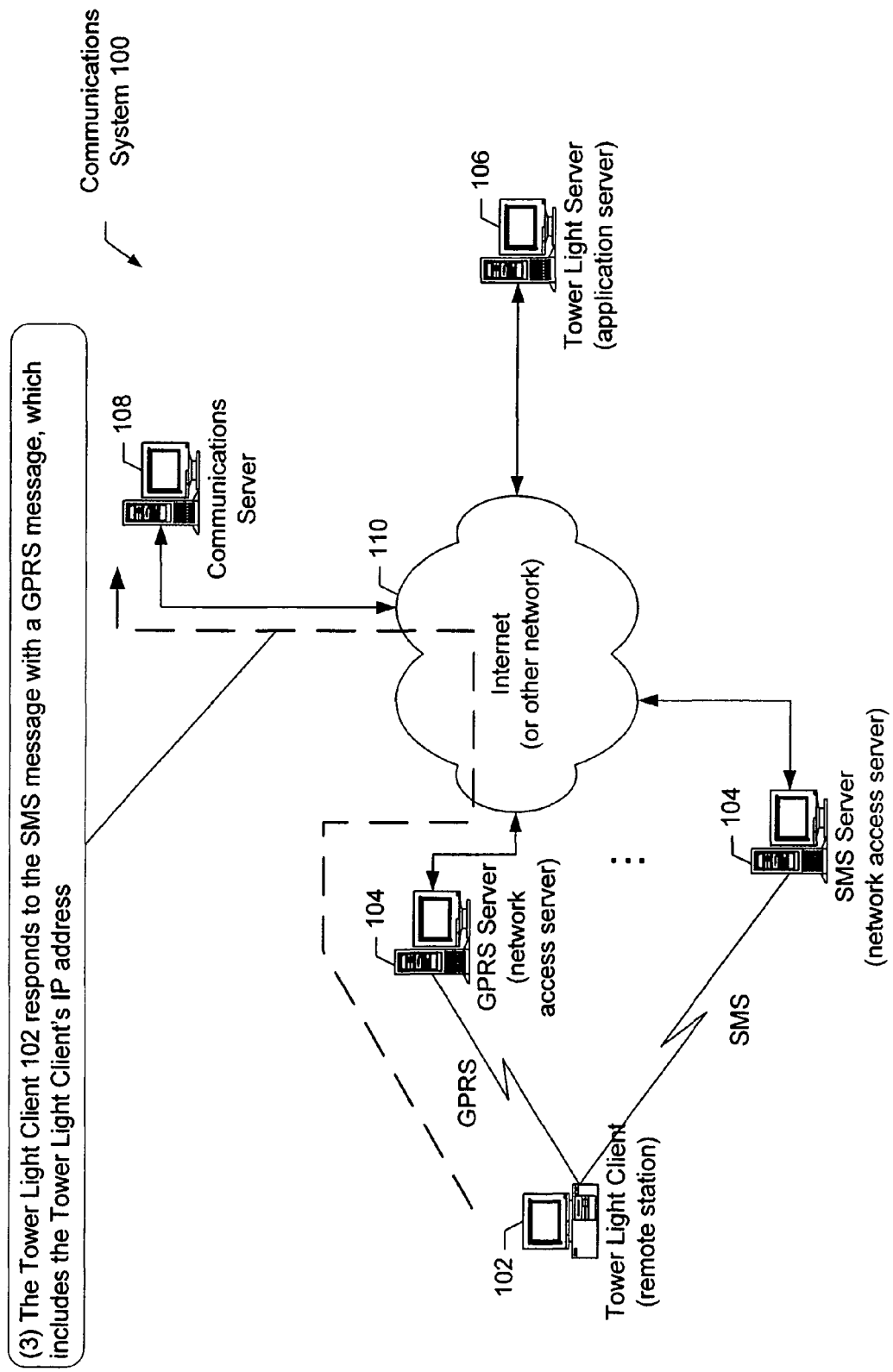
Figure 6D:
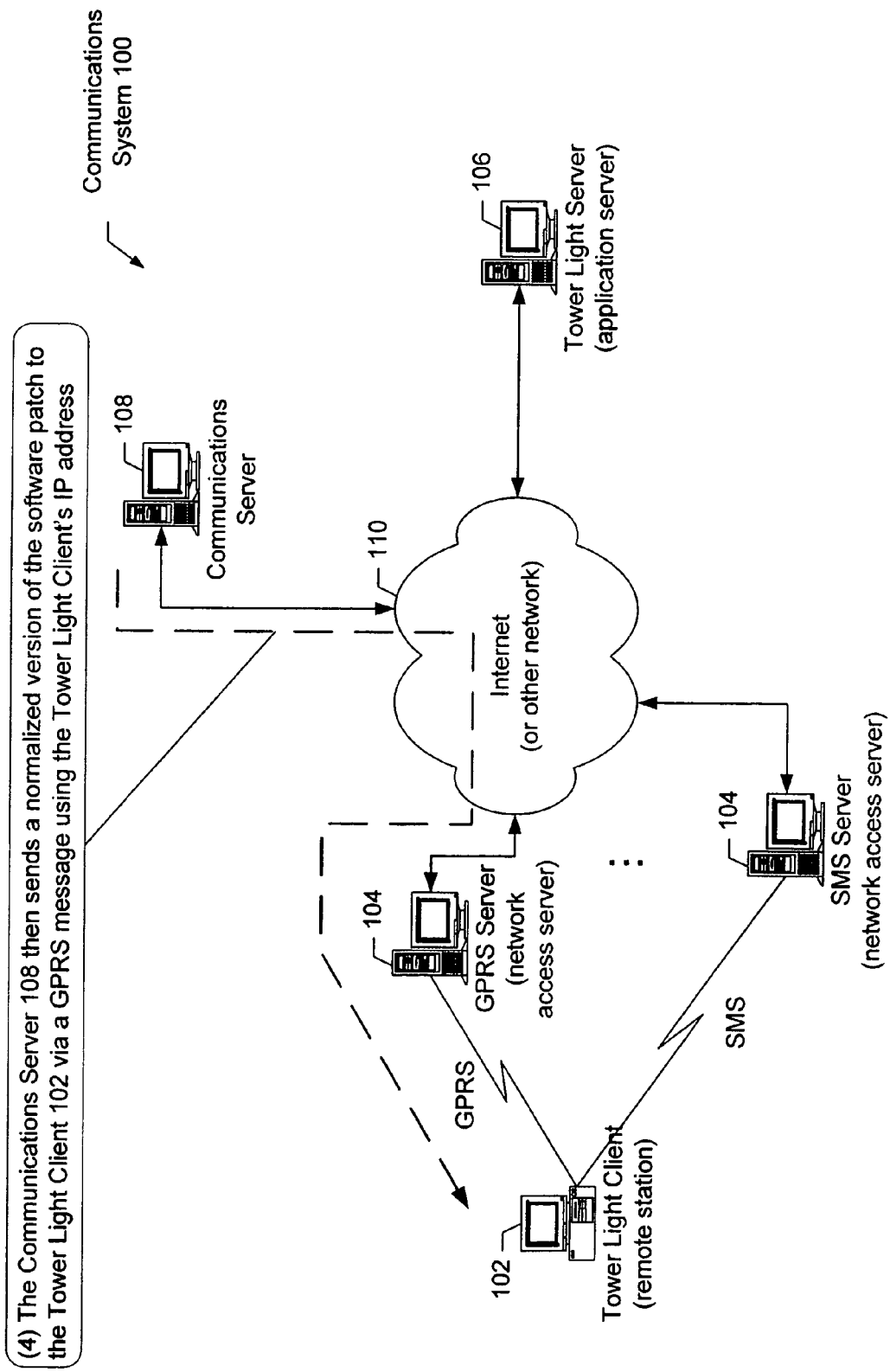
Figure 6E:
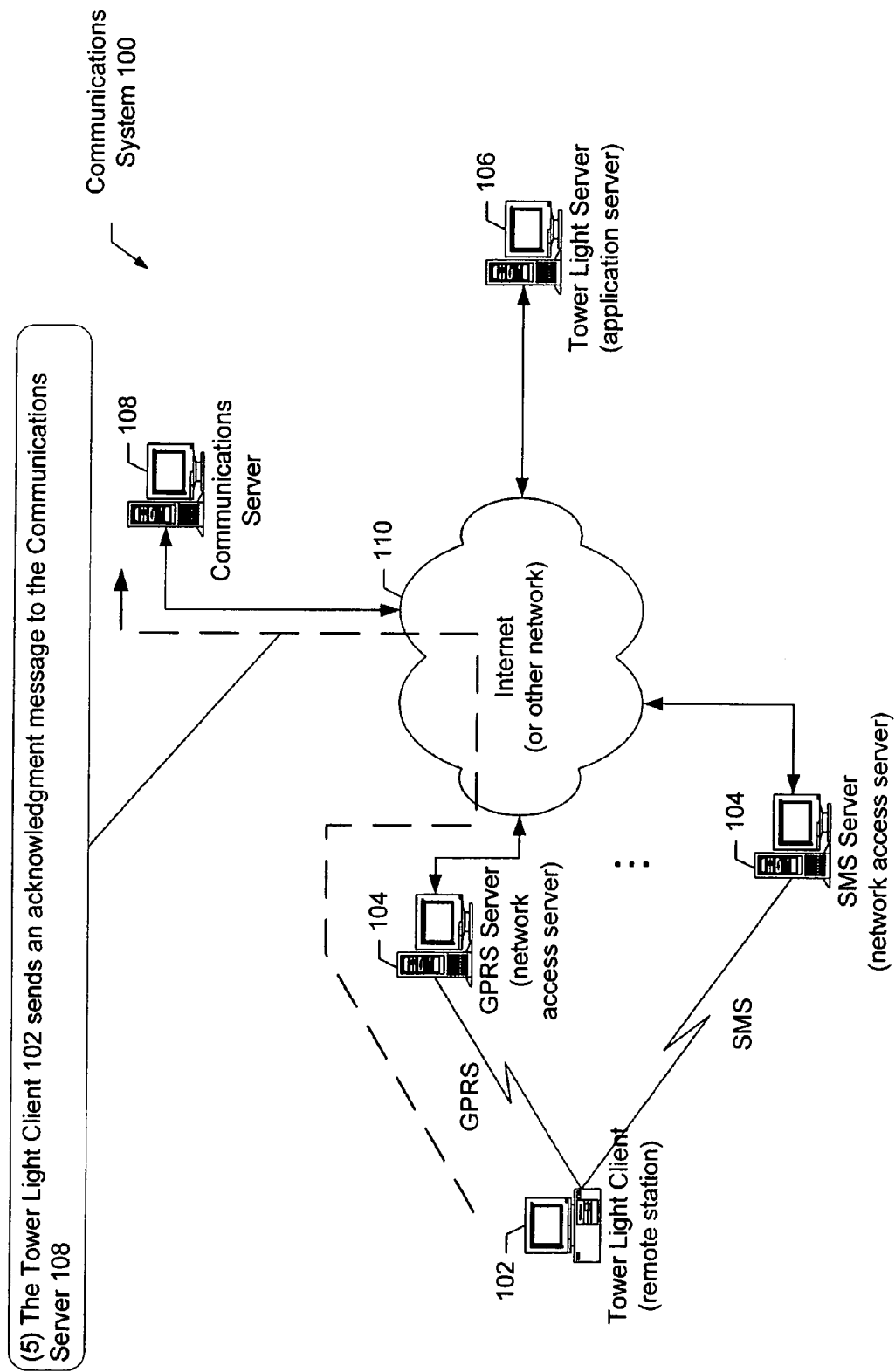
Figure 6F:
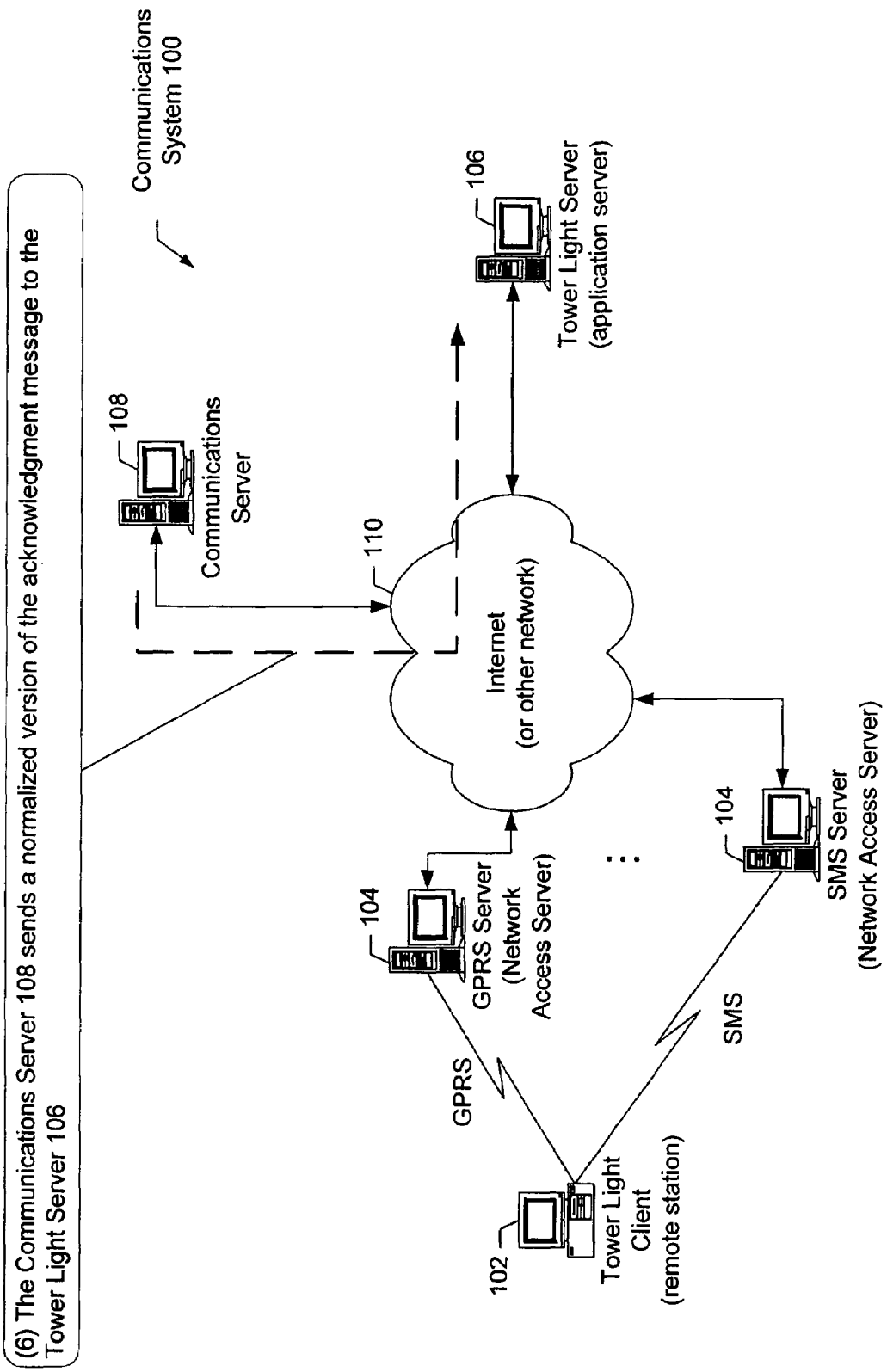

In FIG. 6c, the tower light client 102 responds by obtaining a dynamic IP address (if it did not already have one) from the GPRS server 104. The tower light client 102 then sends a message including the IP address to the communications server 108. In FIG. 6c, the communications server 108 normalizes the software patch message sends it to the tower light client 102 via GPRS using the newly discovered IP address associated with the tower light client 102. In FIG. 6e, the tower light client 102 acknowledges reception of the software patch to the communications server 108, and in FIG. 6f, the communications server 108 sends a normalized version of the acknowledgement message to the tower light server 106.

From the tower light server's perspective, the tower light server 106 merely sent the software patch to the communications server 108 with an identifier associated with the tower light client 102 and received the acknowledgement message. Details about the dynamic IP address of the tower light client 102 were hidden from the tower light server 106.

In summary, it will be appreciated that methods and apparatus for machine-to-machine communications have been provided. The foregoing description has been presented for the purposes of illustration and description. It is not intended to be exhaustive or to limit the invention to the exemplary embodiments disclosed. Many modifications and variations are possible in light of the above teachings. It is intended that the scope of the invention be limited not by this detailed description of examples, but rather by the claims appended hereto.

What is claimed is:

1. A machine-to-machine communications system comprising:
    an application server connected to a wide area network;
    a network access server connected to the wide area network;
    a remote device capable of wireless communication with the network access server, the remote device being associated with a dynamic network address assigned by the network access server;
    a data normalization module associated with the application server configured to convert messages between the application server and the remote device; and
    a dynamic address resolution module associated with the application server, the dynamic address resolution module being structured to initiate a first message to the remote device using a first protocol that does not use the dynamic network address, wherein
    the remote device generates a reply message including the dynamic network address and transmits the reply message to the dynamic address resolution module after receiving the first message;
    the dynamic address resolution module is structured to discover the dynamic network address from the reply message, to determine whether a second message destined for the remote device is larger than a predetermined threshold, and to initiate the second message to the remote device using a second protocol that uses the dynamic network address if the second message is determined to be larger than the predetermined threshold; and
    the dynamic address resolution module is further structured to discover a new dynamic network address from an update message transmitted by the remote device using the second protocol, the new dynamic network address being newly associated with the remote device.

2. The machine-to-machine communications system of claim 1, wherein the dynamic address resolution module is structured to:
    receive a static IP address;
    determine a dynamic IP address based on the static IP address; and
    communicate with the remote device using the dynamic IP address.

3. The machine-to-machine communications system of claim 1, wherein the dynamic address resolution module is structured to determine whether a second message destined for the remote device is smaller than a predetermined threshold and to initiate the second message to the remote device using the first protocol if the second message is smaller than the predetermined threshold.

4. The machine-to-machine communications system of claim 1, wherein the remote device is structured to use a hierarchy of fallback protocols if a message sent using at least one of the first protocol and the second protocol fails.

5. The machine-to-machine communications system of claim 1, wherein the dynamic address resolution module is structured to determine if the dynamic network address is not known by the dynamic address resolution module by checking if a connection to the remote device has been closed by the remote device.

6. The machine-to-machine communications system of claim 1, wherein the dynamic address resolution module is structured to determine if the dynamic network address is not known by the dynamic address resolution module by checking if a message to the remote device fails.

7. The machine-to-machine communications system of claim 1, wherein the data normalization module and the dynamic address resolution module include software residing on a communications server, the communications server communicating with the application server over the wide area network.

8. The machine-to-machine communications system of claim 7, wherein the communications server is structured to buffer communications from the application server to the remote device and from the remote device to the application server.

9. The machine-to-machine communications system of claim 1, wherein the first protocol is a static address protocol.

10. The machine-to-machine communications system of claim 1, wherein the first protocol is a non-IP based protocol.

11. The machine-to-machine communications system of claim 1, wherein the first protocol includes a short message service (SMS) protocol.

12. The machine-to-machine communications system of claim 1, wherein the second protocol is an IP based protocol.

13. The machine-to-machine communications system of claim 1, wherein the second protocol includes a TCP/IP protocol.

14. A method of communicating between an application server and a plurality of remote devices, the method comprising:
    receiving a first message from the application server, the first message including a device identifier associated with a remote device in the plurality of remote devices and a data payload for the remote device;
    sending a second message to the remote device in response to receiving the first message from the application server, the second message being sent via a first wireless protocol that does not use a dynamic network address;
    receiving a third message generated by the remote device, the third message including the dynamic network address associated with the remote device;
    discovering the dynamic network address from the third message by a communication server;
    determining, by the communication server, whether the data payload is larger than a predetermined threshold, wherein the communication server is associated with the application server;
    sending a fourth message to the remote device in response to receiving the third message from the remote device, the fourth message including the data payload, the fourth message being sent via a second wireless protocol that uses the dynamic network address associated with the remote device if the data payload is determined to be larger than the predetermined threshold; and
    discovering a new dynamic network address from an update message transmitted by the remote device via the second wireless protocol, the new dynamic network address being newly associated with the remote device.

15. The method of claim 14, including normalizing the data payload for the remote device.

16. The method of claim 14, wherein the device identifier includes a static IP address, the method including:
    determining a dynamic IP address based on the static IP address; and
    communicating with the remote device using the dynamic IP address.

17. The method of claim 14, wherein the application server is structured to use a hierarchy of fallback protocols if a message sent using at least one of the first wireless protocol and the second wireless protocol fails.

18. A method of communicating between an application server and a plurality of remote devices, the method comprising:
   receiving a first message from the application server, the first message including a device identifier associated with a remote device in the plurality of remote devices and a first data payload for the remote device;
   converting the first data payload to a second data payload associated with the remote device;
   determining, by a communication server, whether the second data payload is smaller than a predetermined threshold, wherein the communication server is associated with the application server;
   sending a second message to the remote device in response to receiving the first message from the application server, the second message including the second data payload if the second data payload is determined to be smaller than the predetermined threshold, the second message being sent via a first wireless protocol that does not use dynamic network addressing;
   if the second data payload is determined not to be smaller than the predetermined threshold:
   receiving a third message generated by the remote device, the third message including a dynamic network address associated with the remote device;
   discovering, by the communication server, the dynamic network address from the third message; and
   sending a fourth message to the remote device in response to receiving the third message from the remote device, the fourth message including the second data payload, the fourth message being sent via a second wireless protocol that uses the dynamic network address associated with the remote device, wherein
   the communication server is structured to update the dynamic network address with a new dynamic network address after receiving an update message transmitted by the remote device via the second wireless protocol, the update message including the new dynamic network address associated with the remote device.

19. The method of claim 18, wherein the device identifier includes a static IP address, the method including:
   determining a dynamic IP address based on the static IP address; and
   communicating with the remote device using the dynamic IP address.

20. The method of claim 18, wherein the application server is structured to use a hierarchy of fallback protocols if a message sent using at least one of the first wireless protocol and the second wireless protocol fails.

* * * * *